(12) United States Patent
Lee et al.

(10) Patent No.: US 8,149,167 B2
(45) Date of Patent: Apr. 3, 2012

(54) SYSTEM AND METHOD FOR REMOVING CHANNEL PHASE ERROR IN A PHASE COMPARISON DIRECTION FINDER

(75) Inventors: Jung Hoon Lee, Daejeon (KR); Kyu Song Lee, Daejeon (KR); Beom Jun Park, Daejeon (KR); Byeong Nam Lee, Daejeon (KR)

(73) Assignee: Agency for Defense Development, Daejeon-Si (KR)

( * ) Notice: Subject to any disclaimer, the term of this patent is extended or adjusted under 35 U.S.C. 154(b) by 162 days.

(21) Appl. No.: 12/778,474

(22) Filed: May 12, 2010

(65) Prior Publication Data

US 2010/0295732 A1 Nov. 25, 2010

(30) Foreign Application Priority Data

May 20, 2009 (KR) ........................ 10-2009-0043968

(51) Int. Cl.
*G01S 5/02* (2010.01)
(52) U.S. Cl. ...................................................... 342/420
(58) Field of Classification Search .................. 342/420
See application file for complete search history.

(56) References Cited

U.S. PATENT DOCUMENTS

| 4,494,118 | A | 1/1985 | Graves | |
|---|---|---|---|---|
| 6,876,321 | B1 * | 4/2005 | Slutzky et al. | .................. 342/13 |
| 7,312,746 | B2 | 12/2007 | Yehudaie | |

OTHER PUBLICATIONS

S. Germishuizen and D.C. Baker; "Practical accuracy limitations in airborne microwave interferometer direction finding", IEEE AFRICON 4th vol. 1, pp. 266-271, Sep. 1996.

* cited by examiner

*Primary Examiner* — Harry Liu
(74) *Attorney, Agent, or Firm* — Pearne & Gordon LLP (57) ABSTRACT

System and method for removing channel phase error in a phase comparison direction finder. By using this system, the phase error, generated in the channel path in finding the direction by using the phase comparison direction finder, can be injected into the receiving channel and removed by using the frequency and intensity of the signal stored in the PDW table. Furthermore, the direction finding correction look-up table can be made using only radiation correction of the antenna unit of the direction finder and channel correction can be carried out without calibrating the direction finder for the direction finding correction look-up table when devices are replaced in the channel of receiving path of the direction finder.

9 Claims, 6 Drawing Sheets

| Freq | AOA | Amp. | Phase data[degree] | | |
|---|---|---|---|---|---|
| | | | Channel 10 | Channel 21 | Channel 32 |
| $f_1$ | $\theta_1$ | $A_1$ | $\Phi_{10}(\theta_1) + AE(f_1, C_{10}, \theta_1, A_1) + CE(f_1, C_{10}, A_1)$ | $\Phi_{21}(\theta_1) + AE(f_1, C_{21}, \theta_1, A_1) + CE(f_1, C_{21}, A_1)$ | $\Phi_{32}(\theta_1) + AE(f_1, C_{32}, \theta_1, A_1) + CE(f_1, C_{32}, A_1)$ |
| | | $A_2$ | $\Phi_{10}(\theta_1) + AE(f_1, C_{10}, \theta_1, A_2) + CE(f_1, C_{10}, A_2)$ | $\Phi_{21}(\theta_1) + AE(f_1, C_{21}, \theta_1, A_2) + CE(f_1, C_{21}, A_2)$ | $\Phi_{32}(\theta_1) + AE(f_1, C_{32}, \theta_1, A_2) + CE(f_1, C_{32}, A_2)$ |
| | | ... | ... | ... | ... |
| | | $A_n$ | $\Phi_{10}(\theta_1) + AE(f_1, C_{10}, \theta_1, A_n) + CE(f_1, C_{10}, A_n)$ | $\Phi_{21}(\theta_1) + AE(f_1, C_{21}, \theta_1, A_n) + CE(f_1, C_{21}, A_n)$ | $\Phi_{32}(\theta_1) + AE(f_1, C_{32}, \theta_1, A_n) + CE(f_1, C_{32}, A_n)$ |
| | $\theta_2$ | $A_1$ | $\Phi_{10}(\theta_1) + AE(f_1, C_{10}, \theta_2, A_1) + CE(f_1, C_{10}, A_1)$ | $\Phi_{21}(\theta_1) + AE(f_1, C_{21}, \theta_2, A_1) + CE(f_1, C_{21}, A_1)$ | $\Phi_{32}(\theta_1) + AE(f_1, C_{32}, \theta_2, A_1) + CE(f_1, C_{32}, A_1)$ |
| | | $A_2$ | $\Phi_{10}(\theta_1) + AE(f_1, C_{10}, \theta_2, A_2) + CE(f_1, C_{10}, A_2)$ | $\Phi_{21}(\theta_1) + AE(f_1, C_{21}, \theta_2, A_2) + CE(f_1, C_{21}, A_2)$ | $\Phi_{32}(\theta_1) + AE(f_1, C_{32}, \theta_2, A_2) + CE(f_1, C_{32}, A_2)$ |
| | | ... | ... | ... | ... |
| | | $A_n$ | $\Phi_{10}(\theta_1) + AE(f_1, C_{10}, \theta_2, A_n) + CE(f_1, C_{10}, A_n)$ | $\Phi_{21}(\theta_1) + AE(f_1, C_{21}, \theta_2, A_n) + CE(f_1, C_{21}, A_n)$ | $\Phi_{32}(\theta_1) + AE(f_1, C_{32}, \theta_2, A_n) + CE(f_1, C_{32}, A_n)$ |
| | ... | ... | ... | ... | ... |
| | $\theta_m$ | $A_1$ | $\Phi_{10}(\theta_m) + AE(f_1, C_{10}, \theta_m, A_1) + CE(f_1, C_{10}, A_1)$ | $\Phi_{21}(\theta_m) + AE(f_1, C_{21}, \theta_m, A_1) + CE(f_1, C_{21}, A_1)$ | $\Phi_{32}(\theta_m) + AE(f_1, C_{32}, \theta_m, A_1) + CE(f_1, C_{32}, A_1)$ |
| | | ... | ... | ... | ... |
| | | $A_n$ | $\Phi_{10}(\theta_m) + AE(f_1, C_{10}, \theta_m, A_n) + CE(f_1, C_{10}, A_n)$ | $\Phi_{21}(\theta_m) + AE(f_1, C_{21}, \theta_m, A_n) + CE(f_1, C_{21}, A_n)$ | $\Phi_{32}(\theta_m) + AE(f_1, C_{32}, \theta_m, A_n) + CE(f_1, C_{32}, A_n)$ |
| $f_2$ | $\theta_1$ | $A_1$ | $\Phi_{10}(\theta_1) + AE(f_2, C_{10}, \theta_1, A_1) + CE(f_2, C_{10}, A_1)$ | $\Phi_{21}(\theta_1) + AE(f_2, C_{21}, \theta_1, A_1) + CE(f_2, C_{21}, A_1)$ | $\Phi_{32}(\theta_1) + AE(f_2, C_{32}, \theta_1, A_1) + CE(f_2, C_{32}, A_1)$ |
| | | $A_2$ | $\Phi_{10}(\theta_1) + AE(f_2, C_{10}, \theta_2, A_2) + CE(f_2, C_{10}, A_2)$ | $\Phi_{21}(\theta_1) + AE(f_2, C_{21}, \theta_2, A_2) + CE(f_2, C_{21}, A_2)$ | $\Phi_{32}(\theta_1) + AE(f_2, C_{32}, \theta_2, A_2) + CE(f_2, C_{32}, A_2)$ |
| | | ... | ... | ... | ... |
| | | $A_n$ | $\Phi_{10}(\theta_1) + AE(f_2, C_{10}, \theta_2, A_n) + CE(f_2, C_{10}, A_n)$ | $\Phi_{21}(\theta_1) + AE(f_2, C_{21}, \theta_2, A_n) + CE(f_2, C_{21}, A_n)$ | $\Phi_{32}(\theta_1) + AE(f_2, C_{32}, \theta_2, A_n) + CE(f_2, C_{32}, A_n)$ |
| | ... | ... | ... | ... | ... |
| | $\theta_m$ | $A_n$ | $\Phi_{10}(\theta_m) + AE(f_2, C_{10}, \theta_m, A_n) + CE(f_2, C_{10}, A_n)$ | $\Phi_{21}(\theta_m) + AE(f_2, C_{21}, \theta_m, A_n) + CE(f_2, C_{21}, A_n)$ | $\Phi_{32}(\theta_m) + AE(f_2, C_{32}, \theta_m, A_n) + CE(f_2, C_{32}, A_n)$ |
| ... | ... | ... | ... | ... | ... |
| $f_n$ | $\theta_m$ | $A_n$ | $\Phi_{10}(\theta_m) + AE(f_n, C_{10}, \theta_m, A_n) + CE(f_n, C_{10}, A_n)$ | $\Phi_{21}(\theta_m) + AE(f_n, C_{21}, \theta_m, A_n) + CE(f_n, C_{21}, A_n)$ | $\Phi_{32}(\theta_m) + AE(f_n, C_{32}, \theta_m, A_n) + CE(f_n, C_{32}, A_n)$ |

| Freq | AOA | Phase data[degree] | | |
|---|---|---|---|---|
| | | Channel 10 | Channel 21 | Channel 32 |
| $f_1$ | $\theta_1$ | $\Phi_{10}(\theta_1)+AE(f_1,C_{10},\theta_1)$ | $\Phi_{21}(\theta_1)+AE(f_1,C_{21},\theta_1)$ | $\Phi_{32}(\theta_1)+AE(f_1,C_{32},\theta_1)$ |
| | $\theta_2$ | $\Phi_{10}(\theta_1)+AE(f_1,C_{10},\theta_2)$ | $\Phi_{21}(\theta_1)+AE(f_1,C_{21},\theta_2)$ | $\Phi_{32}(\theta_1)+AE(f_1,C_{32},\theta_2)$ |
| | ... | ... | ... | ... |
| | $\theta_m$ | $\Phi_{10}(\theta_m)+AE(f_1,C_{10},\theta_m)$ | $\Phi_{21}(\theta_m)+AE(f_1,C_{21},\theta_m)$ | $\Phi_{32}(\theta_m)+AE(f_1,C_{32},\theta_m)$ |
| $f_2$ | $\theta_1$ | $\Phi_{10}(\theta_1)+AE(f_2,C_{10},\theta_1)$ | $\Phi_{21}(\theta_1)+AE(f_2,C_{21},\theta_1)$ | $\Phi_{32}(\theta_1)+AE(f_2,C_{32},\theta_1)$ |
| | ... | ... | ... | ... |
| | $\theta_m$ | $\Phi_{10}(\theta_m)+AE(f_2,C_{10},\theta_m)$ | $\Phi_{21}(\theta_m)+AE(f_2,C_{21},\theta_m)$ | $\Phi_{32}(\theta_m)+AE(f_2,C_{32},\theta_m)$ |
| ... | ... | ... | ... | ... |
| $f_n$ | $\theta_m$ | $\Phi_{10}(\theta_m)+AE(f_n,C_{10},\theta_m)$ | $\Phi_{21}(\theta_m)+AE(f_n,C_{21},\theta_m)$ | $\Phi_{32}(\theta_m)+AE(f_n,C_{32},\theta_m)$ |

FIG. 6

SYSTEM AND METHOD FOR REMOVING CHANNEL PHASE ERROR IN A PHASE COMPARISON DIRECTION FINDER

FIELD OF THE INVENTION

The present invention relates to a phase comparison direction finder employed in the system such as an electronic support (ES) system. More specifically, the invention relates to a system and method for removing channel phase error in a phase comparison direction finder, wherein channel phase error of a direction finder is acquired on the channel path of the direction finder by controlling frequency and intensity of the signal of the built-in test (BIT) equipment, and is removed by comparing measured value of channel phase error of a direction finder with subgroup pulse description word (PDW) data.

BACKGROUND OF THE INVENTION

Generally, conventional direction finders use antenna array to find the direction of the source of electromagnetic radiation. The direction of arrival is determined mainly by receiving the signal from the source via a plurality of antennas and comparing the intensity or phase of the signals.

A phase comparison direction finder determines the angle of arrival (AOA) from the phase difference of the signals received via antenna array, and is known to provide higher resolutions compared to an intensity comparison direction finder. In the ES system, where the AOA of received signal is obtained by comparison of phases, a direction finder scans frequency in the range from a few megahertz to tens of gigahertz to find direction which makes the construction of the system complicated and causing phase errors due to various factors.

Figure 1:
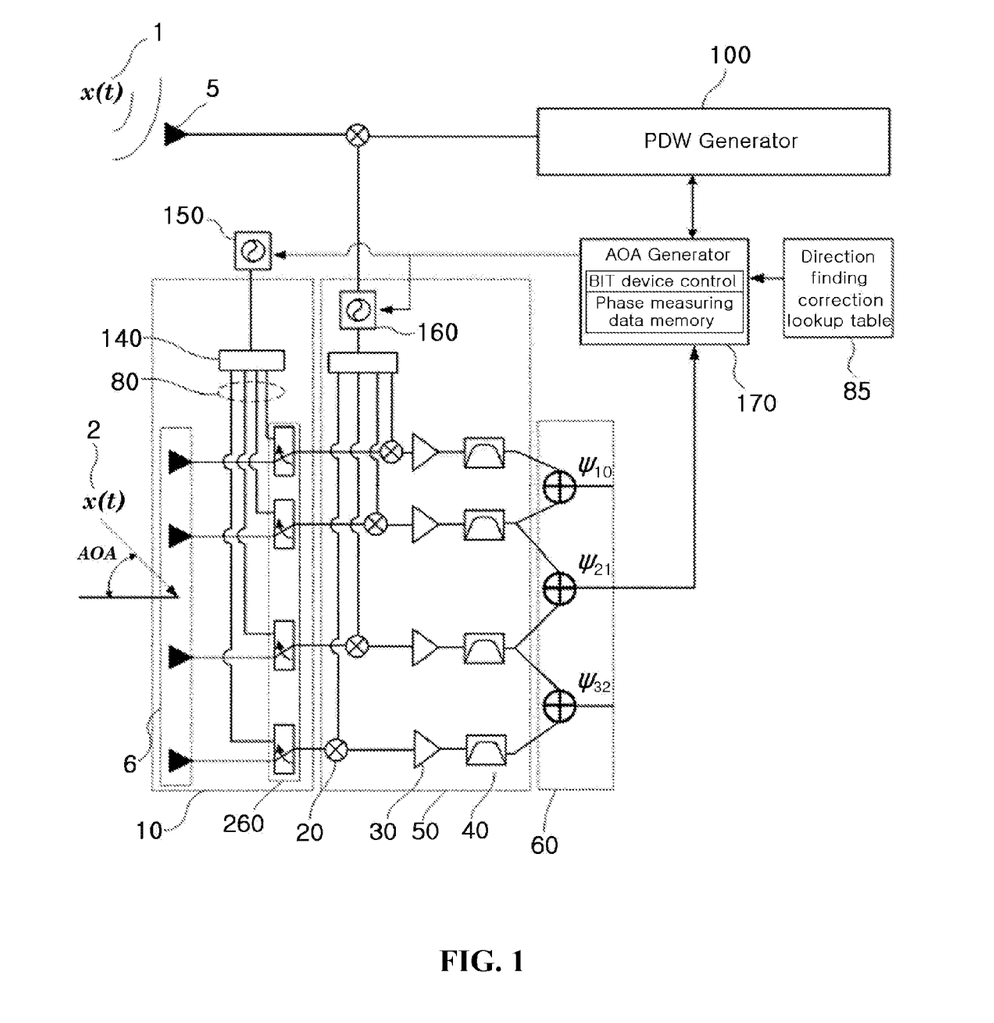
FIG. 1 illustrates the construction of a conventional phase comparison direction finder.

FIG. 1 shows the construction of a conventional phase comparison direction finder.

As shown in FIG. 1, the conventional phase comparison direction finder comprises a signal receiver which receives signal through a single antenna 5, and a direction detector which detects direction through an antenna array 6.

In the above conventional phase comparison direction finder, phase error is generated by the front end receiver 10 and the direction finding (DF) down converter 50. Phase error in the front end receiver 10 is caused due to the arrangement error of each antenna and because each antenna is not exactly the same as one another both physically and electrically, and because the phase of electromagnetic wave is changed while transmitting a radome installed to protect the antenna, and also because of the phase difference between cables connecting the antenna and the switch. This type of phase error is corrected through radiation correction.

Also, the DF down converter 50, which generates phase error, is composed of various channels for evaluating phase difference among antennas in the antenna array 6, a plurality of RF devices and cables. Theoretically, phase error does not add to the phase difference when the electrical length of each channel is all the same, but the output includes the phase difference and the generated error due to the effect of a plurality of devices composing the down converter 50. This type of phase error, which is generated at the devices connected between the front end receiver 10 and digital phase detector 60, and at RF cables, is corrected through channel correction.

Generally, the ES equipment, which receives broad band frequency signals, generates phase error depending on the frequency and intensity of received signal, a receiving angle and internal temperature of the system. So measurement is made per each variable to be corrected after manufacturing the ES equipment, and the measured values are stored in the direction finding correction look-up table 85. The direction finding correction look-up table 85, as shown in FIG. 2 for a direction finder using four antennas, stores the values of radiation correction and channel correction per channel for correcting the error against the frequency and intensity of received signal, a receiving angle.

Also, the AOA generator 170 has the function of controlling BIT equipment 150, which only controls the generation of signals of the BIT equipment, and includes a phase detection data storing memory which temporarily stores the output of the phase detector. In this direction finding correction look-up table 85, the errors which are generated from the front end receiver 10 and DF down converter 50 respectively are stored.

Every time the ES system receives signals from the electromagnetic wave source, AOA is obtained after error has been removed by comparing the signal with the variable data of the look-up table stored according to the frequency, intensity and direction of received signal. The number of the antennas of the ES system or the devices of the DF down converter can be increased in order to obtain more accurate AOA. The increase in the number of the antennas of the ES system or the devices of the DF down converter, however, requires more DF correction look-up table, causing the problem of increasing the amount of memory of the correction look-up table.

Also, there is a problem of renewing the correction look-up table due to the corresponding change in the phase of a channel path whenever one of the channel devices or RF cables of a direction finder is broken and changed.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

SUMMARY

The present invention has been designed to solve the problems of prior art direction finders as described above, and aims to provide a method and apparatus for removing channel phase error in a phase comparison direction finder, wherein channel phase error of a direction finder is acquired on the channel path of the direction finder by controlling frequency and intensity of the signal of the built-in test (BIT) equipment, and is removed by comparing measured value of channel phase error of a direction finder with subgroup pulse description word (PDW) data.

DISCLOSURE

In order to achieve the above objective of the present invention, the invention provides a system for removing channel phase error in a phase comparison direction finder, which comprises: a pulse description word (PDW) generator which measures characteristics of signal input into the electronic support (ES) receiver; a direction finder which outputs the angle of arrival (AOA) of the signal input into the ES receiver as a phase difference, a direction finding correction look-up table which stores the phase difference data for use in the calculation of AOA; and an AOA generator which calculates and removes the channel phase error by comparing the phase difference output from the direction finder with the phase difference stored in the direction finding correction look-up table, and evaluates the AOA of the signal input into the direction finder, the AOA generator having the function of controlling the built-in test (BIT) equipment, storing the subgroup PDW data on the characteristics of signal measured in the ES receiver and generating BIT equipment control table, and also having memory for storing phase measuring data, and the BIT equipment comprising a local oscillator for transforming the frequency of received signal, and an attenuator for attenuating the power of the signal transmitted to the distributor of the direction finder through the local oscillator.

The function of controlling the BIT equipment of the AOA generator can include the function of controlling the BIT equipment and the switch device of the front end receiver of the direction finder.

Further, the output frequency of the BIT equipment can be controlled to be equal to the frequency of the BIT equipment control table.

And, the output intensity of the BIT equipment can be controlled to be equal to the intensity of the BIT equipment control table.

Also, preferably, the output phase of the RF cable connecting the distributor in the front end receiver and a plurality of switch devices is controlled to have the same phase.

The present invention also provides a method for removing channel phase error in a phase comparison direction finder, comprising:
(a) storing the frequency and intensity of the signal generated at the PDW generator of the ES system, and the phase difference generated at the phase detector of the direction finder to the subgroup PDW table;
(b) generating a BIT equipment control table and indexed subgroup PDW table;
(c) controlling the local oscillator and the attenuator of the BIT equipment with the frequency and intensity of the BIT equipment control table;
(d) adding the phase difference detected at the phase detector to the BIT equipment control table and storing the added data to a channel measurement data table;
(e) removing channel phase error of the direction finder by comparing the indexed subgroup PDW table data with the data in the channel measurement data table; and
(f) evaluating AOA of the signal input into the direction finder by using the direction finding correction look-up table.

In generating the BIT equipment control table in the step (b), the data having the same frequency and intensity in the subgroup PDW table can be incorporated into one data and then indexed.

Also, in generating the indexed subgroup PDW table in the step (b), the items having the same frequency and intensity in the subgroup PDW table can be indexed with the same index number.

Preferably, the direction finding correction look-up table in the step (f) does not include the channel phase error of the direction finder.

EFFECT OF THE INVENTION

By using the system for removing channel phase error in a phase comparison direction finder according to the present invention, the phase error, generated in the channel path in finding the direction by using the phase comparison direction finder, can be injected into the receiving path of the direction finder and removed by using the frequency and intensity of the signal stored in the PDW table. In this system, the direction finding correction look-up table can be made using only radiation correction of the antenna unit of the direction finder and channel correction can be carried out without calibrating the direction finder for the direction finding correction look-up table when devices are replaced in the channel of receiving path of the direction finder.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 2 illustrates the direction finding correction look-up table related to direction finding with 4 antennas by using the phase comparison direction finder of FIG. 1;

DESCRIPTION OF THE NUMERALS IN THE DRAWINGS

The following table provides a description of the numerals in the drawings:

| Number | Description |
| --- | --- |
| 10 | front end receiver |
| 20 | converter |
| 30 | amplifier |
| 40 | filter |
| 50 | DF down converter |
| 60 | phase detector |
| 90 | direction finding correction look-up table |
| 100 | PDW generator |
| 140 | distributor |
| 160 | local oscillator |
| 200 | AOA generator |
| 260 | switching device |
| 270 | BIT equipment |
| 271 | local oscillator |
| 275 | attenuator |
| 280 | RF cable |

Description of Example Embodiments

The present invention will be described in more detail with reference to the drawings attached.

Figure 3:
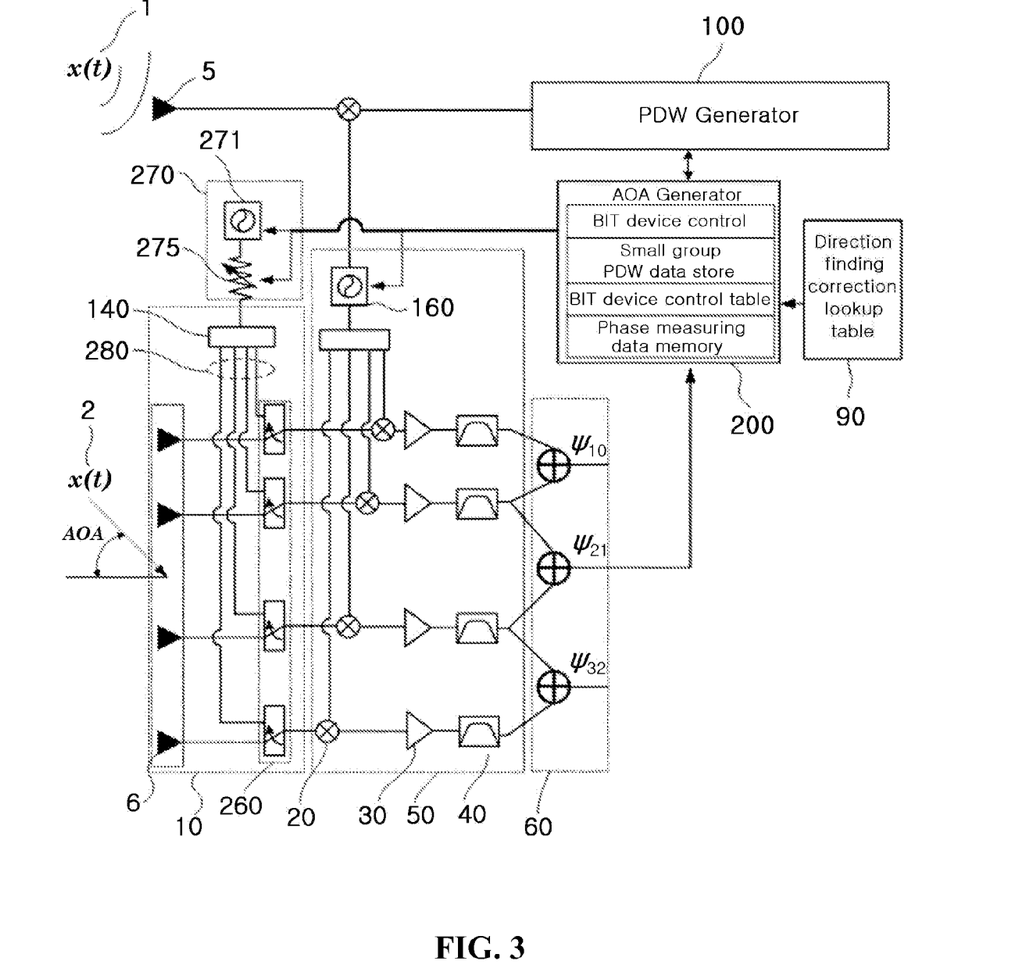
FIG. 3 schematically illustrates the construction of the system for removing channel phase error in a phase comparison direction finder of the present invention.

FIG. 3 schematically illustrates the construction of the system for removing channel phase error in a phase comparison direction finder of the present invention.

As shown in FIG. 3, the system for removing channel phase error in a phase comparison direction finder of the present invention includes a PDW generator 100, a direction finder, a correction look-up table for direction finding 90 and an AOA generator 200.

The PDW generator 100 measures the characteristics of the signal (for example, frequency, TOA (Time of arrival), intensity, pulse width or phase difference) which is input to the ES receiver (such as a phase comparison direction finder).

The direction finder outputs the AOA of signal received by an ES receiver as phase difference. This type of direction finder includes a front end receiver 10, a DF down converter 50 and a phase detector 60. The front end receiver 10 comprises a plurality of antennas 6 for direction finding, a distributor 140 which receives an output signal from a BIT equipment and distributes the signal to a plurality of channels, and a switching unit 260 comprising a plurality of switching devices which selectively switch between the circuits of the antennas 6 for direction finding and the distributor 140. And the DF down converter 50 comprises a transformer 20 which transforms the frequency of the input signal, an amplifier 30 which amplifies the signal output from the transformer 20, and a filter 40 which filters the signal amplified by the amplifier 30. Also, the phase detector 60 outputs phase difference by comparing the phase of each channel signal.

Figure 6:
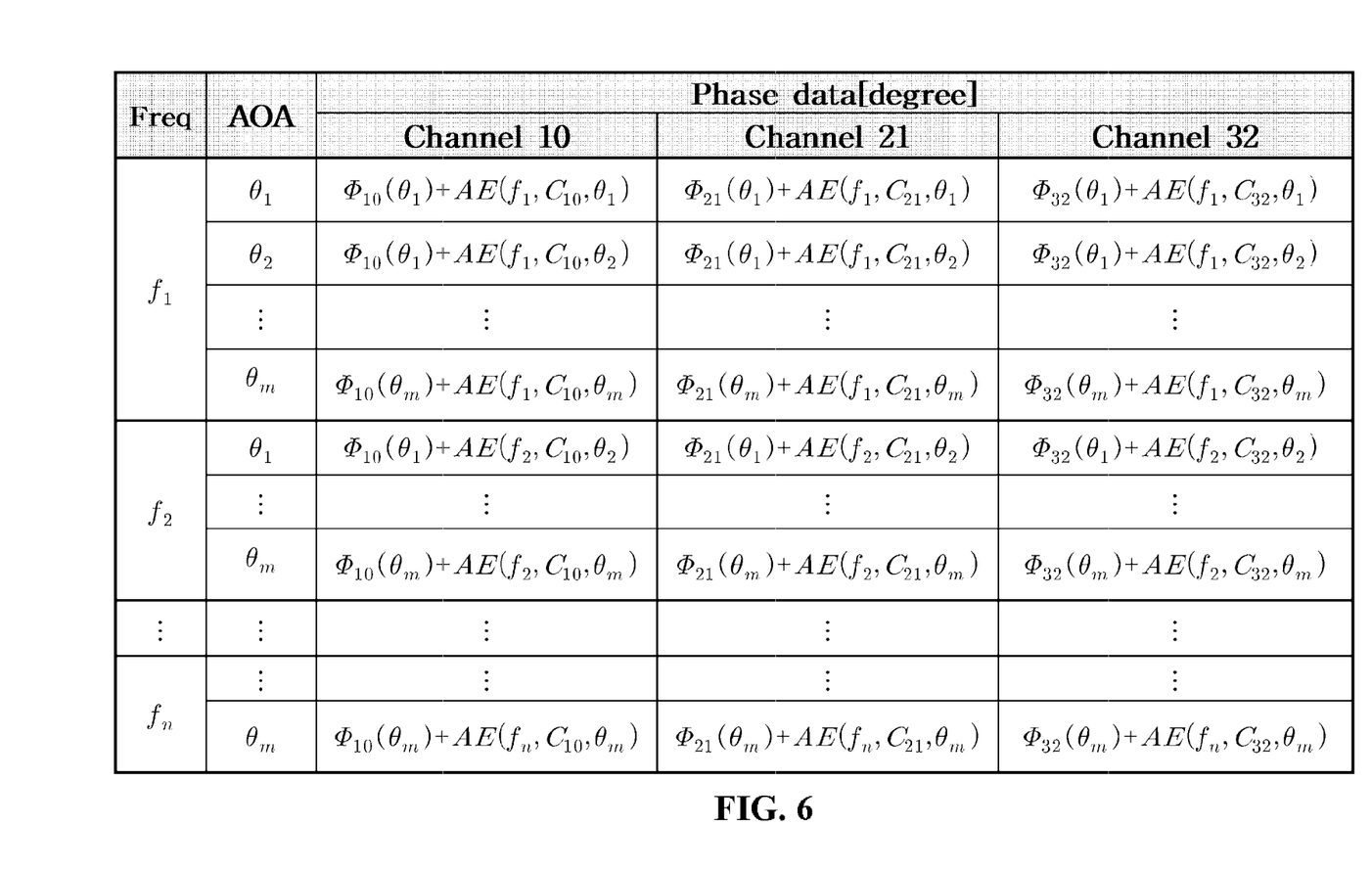
FIG. 6 illustrates the direction finding correction look-up table in connection with direction finding by using 4 antennas of the system of FIG. 3.

The direction finding correction look-up table 90 stores the phase difference data for calculating the AOA, as shown in FIG. 6.

The AOA generator 200 calculates and removes the channel phase error by comparing the phase difference output from the direction finder (more specifically from the phase detector 60 of the direction finder), with the phase difference stored in the direction finding correction look-up table, and evaluates the AOA of the signal input into the direction finder. The AOA generator 200 has the function of controlling the BIT equipment 270, storing the subgroup PDW data on the characteristics of signal measured in the ES receiver and generating BIT equipment control table, and also has memory for storing phase measuring data.

The BIT equipment 270 comprises a local oscillator 271 for transforming the frequency of received signal, and an attenuator 275 for attenuating the power of the signal transmitted to the distributor 140 of the direction finder through the local oscillator 271. Digital attenuator can be used as an attenuator 275.

The function of controlling the BIT equipment of the AOA generator 200 can include the function of controlling the BIT equipment and the switch device of the front end receiver 10 of the direction finder.

Also, the output frequency of the BIT equipment 270 can be controlled to be equal to the frequency of the BIT equipment control table.

Also, the output intensity of the BIT equipment 270 can be controlled to be equal to the intensity of the BIT equipment control table.

Also, the output phase of the RF cable 280, which connects the distributor 140 in the front end receiver 10 and a plurality of switch devices, is preferably controlled to have the same phase.

From now, the method for removing channel phase error in a phase comparison direction finder using the system for removing channel phase error of the present invention will be described.

Figure 4:
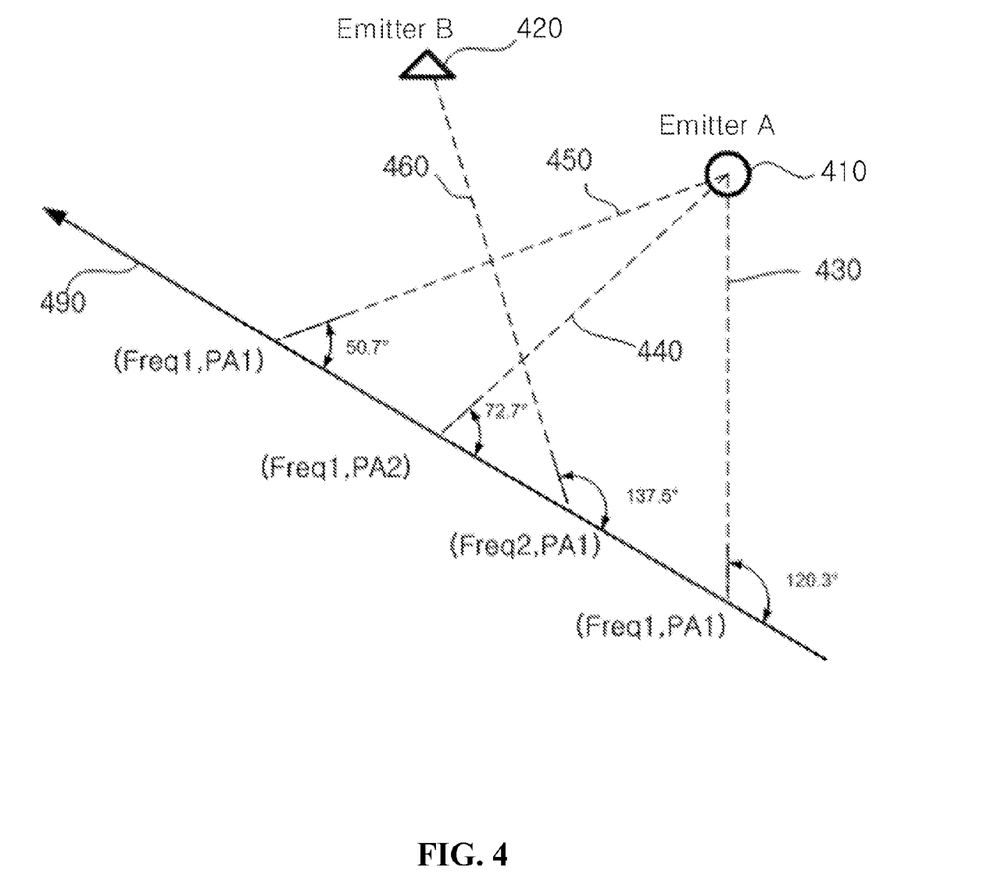
FIG. 4 illustrates the case of collecting the signal of two emitters by the signal receiving unit in connection with the flow diagram of FIG. 5.
Figure 5:
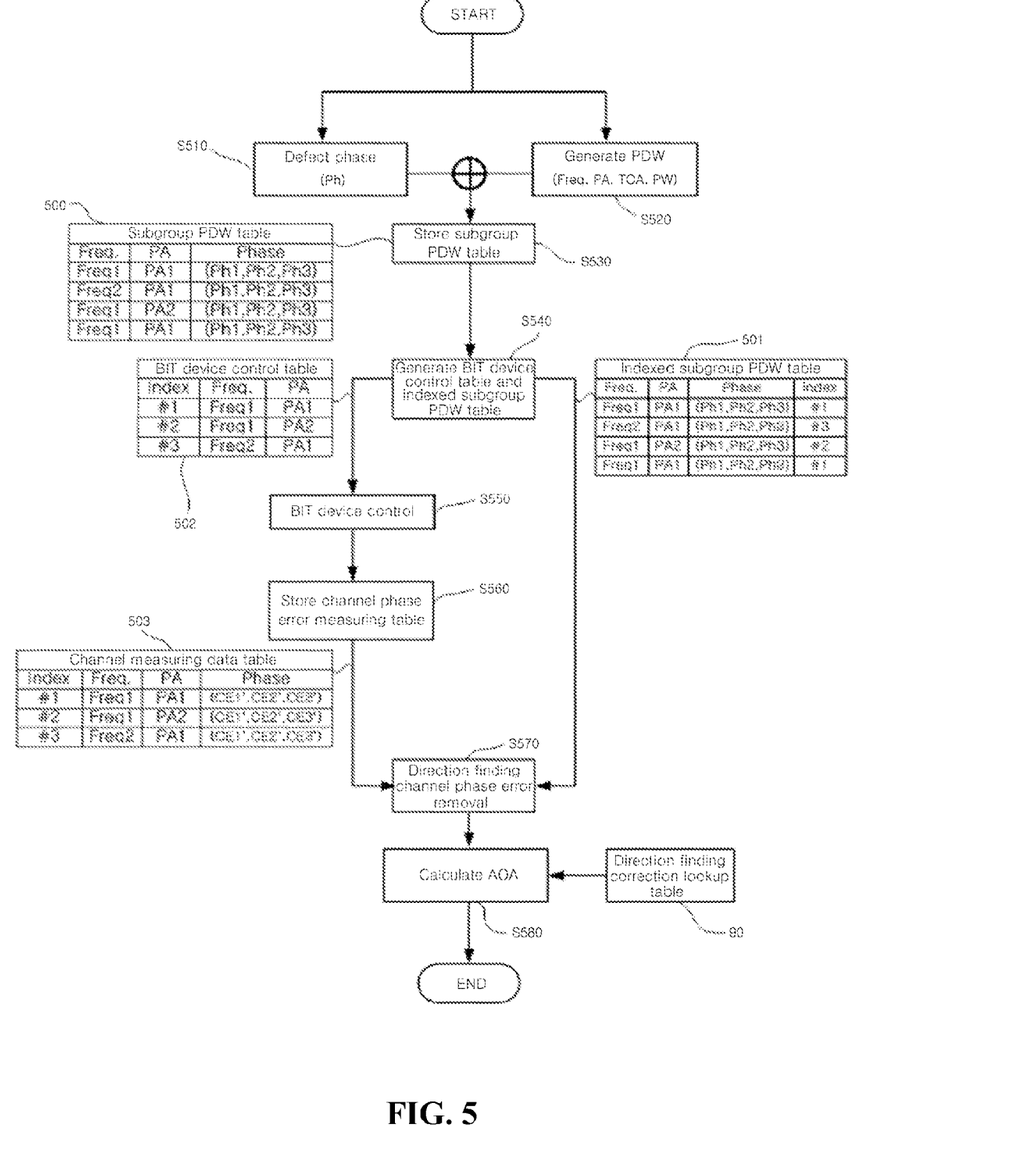
FIG. 5 is a flow diagram illustrating the process of removing channel phase error of the direction finder of the present invention.

FIG. 4 is provided to help understand the procedure of removing the channel phase error in the phase comparison direction finder of FIG. 5 of the present invention, and illustrates the case of collecting the signal of two emitters by the signal receiving unit.

With reference to FIG. 4, the ES system, while moving along predetermined path 490, receives the signals generated at the emitter A 410 and emitter B 420, i.e., the Freq1, PA1 for signal 430, the Freq2, PA1 for signal 460, the Freq1, PA2 for signal 440 and the Freq1, PA1 for signal 450.

In the system of FIG. 3, when the signals are input into the antenna 5 of the ES system, the PDW generator 100 measures and stores the characteristics of the received signal such as frequency, TOA, intensity, pulse width and phase difference. When wireless signal 1 is received by the antenna 5, the signal 2 is simultaneously input to the antenna 6 for direction finding.

The signal which is input into the antenna 6 for direction finding is transferred through the front end receiver 10 and the frequency of the received signal is transformed by the transformer 20, amplified by the amplifier 30 and filtered by the filter 40. The signal filtered by the filter 40 is input into phase detector 60, and the phase detector 60 outputs a phase difference by comparing the phase of each channel signal. The channel phase difference output from the phase detector 60 can be represented as the following formula 1:

$$\Psi_{n+1,n} = \frac{2\pi}{\lambda} D_n \sin(AOA) + AE' + CE',\qquad \text{Formula 1}$$

where $\lambda$ is wavelength of received signal, $D_n$ the interval between (n−1)th and nth antenna, AOA the angle of arrival, AE' the front end receiver error between the (n+1)th and nth direction finder, CE' the DF down converter error between the (n+1)th and nth antennas.

This phase difference includes the error generated by the front end receiver 10 and the DF down converter 60. The phase difference data is stored at the data store memory of the AOA generator 200.

Meanwhile, when the PDW generator 100 requests phase difference information, the AOA generator 200 provides the phase difference data stored at the phase measurement memory with the PDW generator 100. At this step, the frequency and intensity data stored at the PDW generator 100 and phase difference data output from the phase detector 60 are simultaneously input into the AOA generator 200 in order to remove the channel phase error of the direction finder. This process is carried out at the step of storing subgroup PDW table of FIG. 5 (S530). The process will be explained further with reference to FIG. 5.

FIG. 5 is a flow diagram illustrating the process of removing channel phase error of the phase comparison direction finder of the present invention.

With reference to FIG. 5, according to the method for removing channel phase error of the phase comparison direction finder of the present invention, the frequency and intensity data generated at the PDW generator 100 of the ES system and phase difference data detected at the phase detector 60 are stored at the PDW table 501 (Step S510, S520, S530). Then BIT control table 502 and indexed subgroup PDW table 501 is made (Step S540).

Now the local oscillator 271 of the BIT equipment 270 and attenuator 275 are controlled with the frequency and intensity of the BIT equipment control table 502 (Step S550). And the phase difference output from the phase detector 60 is added to the BIT equipment control table 502 and stored at the channel measurement data table 503 (Step S560).

Then, the channel phase error of the direction finder is removed by comparing the data of the indexed subgroup PDW table 501 and the data in the channel measurement data table 503 (Step S570). Then, the AOA of the signal input into the direction finder is evaluated by using the direction finding correction look-up table 90 (Step S580).

In generating the BIT equipment control table 502 at step 540, the data having the same frequency and intensity in the subgroup PDW table 501 can be incorporated into one data and then indexed.

Also, in generating the indexed subgroup PDW table 501 at the step S540, the items having the same frequency and intensity in the subgroup PDW table 501 are indexed as the same index number.

Preferably, the direction finding correction look-up table 90 at the step S580 does not include the channel phase error of the direction finder and the intensity of the received signal.

Meanwhile, the indexed subgroup PDW table 501 includes channel phase error. When the frequencies and intensities of the received signal (such as (Freq1, PA1) on signal 450) is the same, the phase differences generated at the direction finder are also the same. Therefore, the items which have the same frequency and intensity as those of the indexed subgroup PDW table 501 are assigned the same index number.

Also, the BIT equipment control table 502 selects one index from duplicated indexes sorts the items in the order of frequencies and intensities and stores them in order to control the BIT equipment 270.

The reason of sorting and indexing at this step is that the errors generated at the channel of the direction finder are same when the frequencies and intensities of the received signal (such as (Freq1, PA1) on signal 430 or (Freq1, PA1) on signal 450) are same or within the resolution of the device.

At the step of controlling the BIT equipment (S550), switchover is made from the input of the antenna 6 of the direction finder to the input of the local oscillator 270 of the BIT equipment by controlling the switching device 260 located at the front end receiver 10. After the switchover, the local oscillator 271 and digital attenuator 275 of the BIT equipment 270 are controlled by using the frequency and intensity of the BIT equipment control table 502. At this step it may be noticed that there are no digital attenuator 275 in the BIT equipment 150 of FIG. 1 as in FIG. 3 since the intensity of the output signal for BIT equipment is constant.

The signal of the local oscillator 271 for BIT equipment is input through the distributor 140 into each switch of the switching device 260. At this step, the RF cables 280 between the distributor 140 and each switch of the switching device 260 of the front end receiver 10 are not the same as the RF cable 80 of FIG. 1. When RF cable 80 is used for the BIT equipment, the phase input to each switch needs not be the same while the phases of the RF cable 280 for correcting channel should be nearly the same. Hence, the phases input to each switch are nearly the same electrically.

The phase difference which is output from the phase detector 60 of the direction finder is the value of error generated at each channel of the DF down converter 50. Therefore, the output phase difference is represented by the following formula 2:

$$CE'=[CE'_{10}(0), CE'_{21}(0), CE'_{32}(0)]^T \qquad \text{Formula 2}$$

where T is a transpose of the matrix.

Theoretically, the output phase difference between channels should be zero when the input phases are all the same. Practically, however, phase difference emerges due to many factors for phase error in each channel as described before.

The BIT equipment control table 502, after the step of controlling BIT equipment (S550), is added the channel measurement phase error data and stored at the channel measurement data table 503 by the step of storing the channel measurement phase error data (S580).

Since the indexed subgroup PDW table 501 includes the phase error of the front end receiver 10 and the phase error of the DF down converter 50, the AOA generator 100 carry out the calculation of channel phase error by using the channel measurement data table 503 and indexed subgroup PDW table 501 in order to remove each channel phase error. This calculation is carried out at the step (S570) of removing channel phase error of the direction finder of FIG. 5. The result of the calculation can be represented as in the following formula 3:

$$\Psi = \begin{bmatrix} \Phi_{10} + AE'_{10} + CE'_{10} \\ \Phi_{21} + AE'_{21} + CE'_{21} \\ \Phi_{32} + AE'_{32} + CE'_{32} \end{bmatrix} - \begin{bmatrix} CE'_{10}(0) \\ CE'_{21}(0) \\ CE'_{32}(0) \end{bmatrix} \qquad \text{Formula 3}$$

$$= \begin{bmatrix} \Phi_{10} + AE'_{10} \\ \Phi_{21} + AE'_{21} \\ \Phi_{32} + AE'_{32} \end{bmatrix}$$

Thus, the process of removing channel phase error of a direction finder is completed and the process of evaluating AOA begins.

The AOA generator 200 should use the direction finding correction look-up table 90 in order to obtain the AOA of the signal received by the direction finder. In the present invention, as shown in FIG. 6, the direction finding correction look-up table does not include, other than shown in FIG. 2, the item of signal intensity and according to frequency and channel phase error data.

In the final step, AOA is evaluated by the following formula 4 using the minimum vector distance method:

$$R^2(\theta_i)=(\phi_{10}-\hat{\phi}_{\hat{1}\hat{0}}(\theta_i))^2+(\phi_{21}-\hat{\phi}_{\hat{2}\hat{1}}(\theta_i))^2+(\phi_{32}-\hat{\phi}_{\hat{3}\hat{2}}(\theta_i))^2,$$
$$i=1,2,\ldots,m \qquad \text{Formula 4}$$

where $$\hat{\phi}_{\hat{1}\hat{0}}(\theta_i)=\Phi_{10}(\theta_i)+AE_{10}(\theta_i), \hat{\phi}_{\hat{2}\hat{1}}(\theta_i)=\Phi_{21}(\theta_i)+AE_{21}(\theta_i),$$
$$\hat{\phi}_{\hat{3}\hat{2}}(\theta_i)=\Phi_{32}(\theta_i)+AE_{32}(\theta_i)$$

is a phase data stored in the direction finding correction look-up table.

Finally, the AOA generator 200 selects and outputs the phase data that makes the signal AOA minimum.

In accordance with the disclosure, a method is provided for removing channel phase error in a phase comparison direction finder, which comprises: a pulse description word (PDW) generator which measures characteristics of signal input into the electronic support (ES) receiver, a direction finder which outputs the angle of arrival (AOA) of the signal input into the ES receiver as a phase difference, a direction finding correction look-up table which stores the phase difference data for use in the calculation of AOA, and an AOA generator which calculates and removes the channel phase error by comparing the phase difference output from the direction finder with the phase difference stored in the direction finding correction look-up table, and evaluates the AOA of the signal input into the direction finder, the AOA generator having the function of controlling the built-in test (BIT) equipment, storing the subgroup PDW data on the characteristics of signal measured in the ES receiver and generating BIT equipment control table, and also having memory for storing phase measuring data, and the BIT equipment comprising a local oscillator for transforming the frequency of received signal, and an attenuator for attenuating the power of the signal transmitted to the distributor of the direction finder through the local oscillator. By using the system for removing channel phase error in a phase comparison direction finder according to the present invention, the phase error, generated in the channel path in finding the direction by using the phase comparison direction finder, can be injected into the receiving channel and removed by using the frequency and intensity of the signal stored in the PDW table. In this system, the direction finding correction look-up table can be made using only radiation correction of the antenna unit of the direction finder and channel correction can be carried out without calibrating the direction finder for the direction finding correction look-up table when devices are replaced in the channel of receiving path of the direction finder.

The invention has been described with reference to preferable examples, but the invention is not limited by the examples which can obviously be modified and specified within the scope of the present invention. Therefore, the scope of the invention should be interpreted in terms of the claims and any technical idea which is equivalent to the present invention is deemed to be within the scope of the invention.

What is claimed is:

1. A system for removing channel phase error in a phase comparison direction finder, which comprises:
    a pulse description word (PDW) generator which measures characteristics of signal input into the electronic support (ES) receiver,
    a direction finder which outputs the angle of arrival (AOA) of the signal input into the ES receiver as a phase difference,
    a direction finding correction look-up table which stores the phase difference data for use in the calculation of AOA,
    an AOA generator which calculates and removes the channel phase error by comparing the phase difference output from the direction finder with the phase difference stored in the direction finding correction look-up table, and evaluates the AOA of the signal input into the direction finder,
    the AOA generator having the function of controlling the built-in test (BIT) equipment, storing the subgroup PDW data on the characteristics of signal measured in the ES receiver and generating BIT equipment control table, and also having memory for storing phase measuring data, and
    the BIT equipment comprising a local oscillator for transforming the frequency of received signal, and an attenuator for attenuating the power of the signal transmitted to the distributor of the direction finder through the local oscillator.

2. The system of claim 1, wherein the function of controlling the BIT equipment of the AOA generator includes the function of controlling the BIT equipment and the switch device of the front end receiver of the direction finder.

3. The system of claim 1, wherein the output frequency of the BIT equipment is controlled to be equal to the frequency of the BIT equipment control table.

4. The system of claim 1, wherein the output intensity of the BIT equipment is controlled to be equal to the intensity of the BIT equipment control table.

5. The system of claim 2, wherein the output phase of the RF cable connecting the distributor in the front end receiver and a plurality of switch devices is controlled to have the same phase.

6. A method for removing channel phase error in a phase comparison direction finder, which comprises:
    (a) storing the frequency and intensity of the signal generated at the PDW generator of the ES system, and the phase difference generated at the phase detector of the direction finder to the subgroup PDW table;
    (b) generating a BIT equipment control table and indexed subgroup PDW table;
    (c) controlling the local oscillator and the attenuator of the BIT equipment with the frequency and intensity of the BIT equipment control table;
    (d) adding the phase difference detected at the phase detector to the BIT equipment control table and storing the added data to a channel measurement data table;
    (e) removing channel phase error of the direction finder by comparing the indexed subgroup PDW table data with the data in the channel measurement data table; and
    (f) evaluating AOA of the signal input into the direction finder by using the direction finding correction look-up table.

7. The method of claim 6, wherein, in generating the BIT equipment control table at the step (b), the data having the same frequency and intensity in the subgroup PDW table are incorporated into one data and then indexed.

8. The method of claim 6, wherein, in generating the indexed subgroup PDW table at the step (b), the items having the same frequency and intensity in the subgroup PDW table are indexed with the same index number.

9. The method of claim 6, wherein the direction finding correction look-up table at the step (f) does not include the channel phase error of the direction finder and the intensity of the received signal.

* * * * *